Oct. 5, 1954 E. G. ARELT 2,690,620
APPARATUS FOR GAUGING DISHES
Filed Aug. 30, 1950 8 Sheets-Sheet 1

INVENTOR.
EUGENE G. ARELT
BY Bodell & Thompson
ATTORNEYS

Oct. 5, 1954     E. G. ARELT     2,690,620
APPARATUS FOR GAUGING DISHES
Filed Aug. 30, 1950     8 Sheets-Sheet 2

INVENTOR.
EUGENE G. ARELT
BY Bodell & Thompson
ATTORNEYS

Oct. 5, 1954

E. G. ARELT 2,690,620

APPARATUS FOR GAUGING DISHES

Filed Aug. 30, 1950

INVENTOR.
EUGENE G. ARELT
BY Bodell & Thompson
ATTORNEYS

Oct. 5, 1954          E. G. ARELT          2,690,620
APPARATUS FOR GAUGING DISHES
Filed Aug. 30, 1950          8 Sheets-Sheet 5
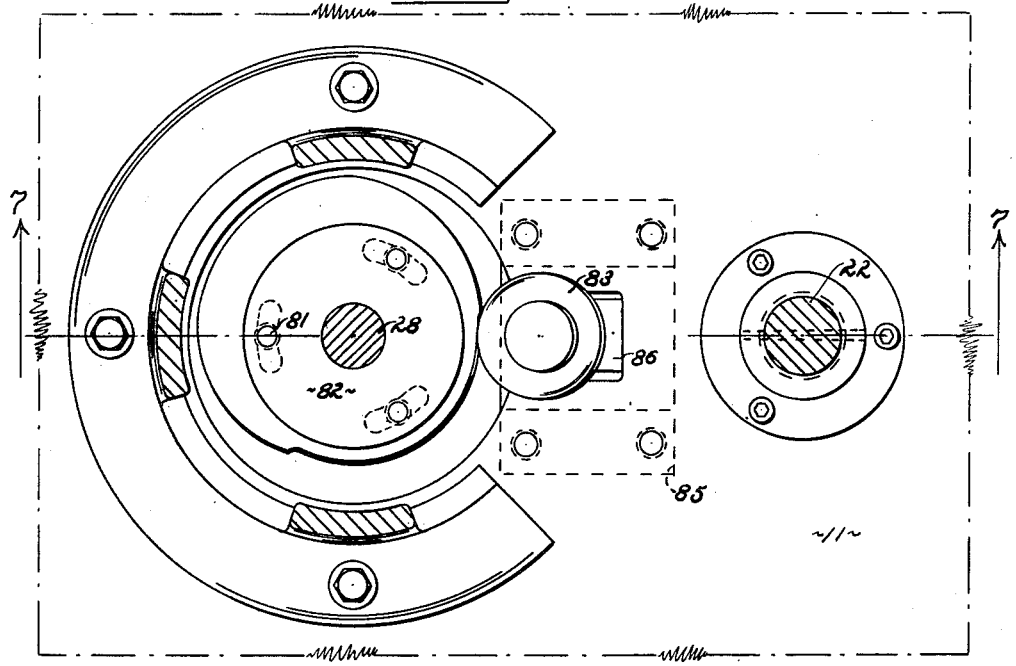
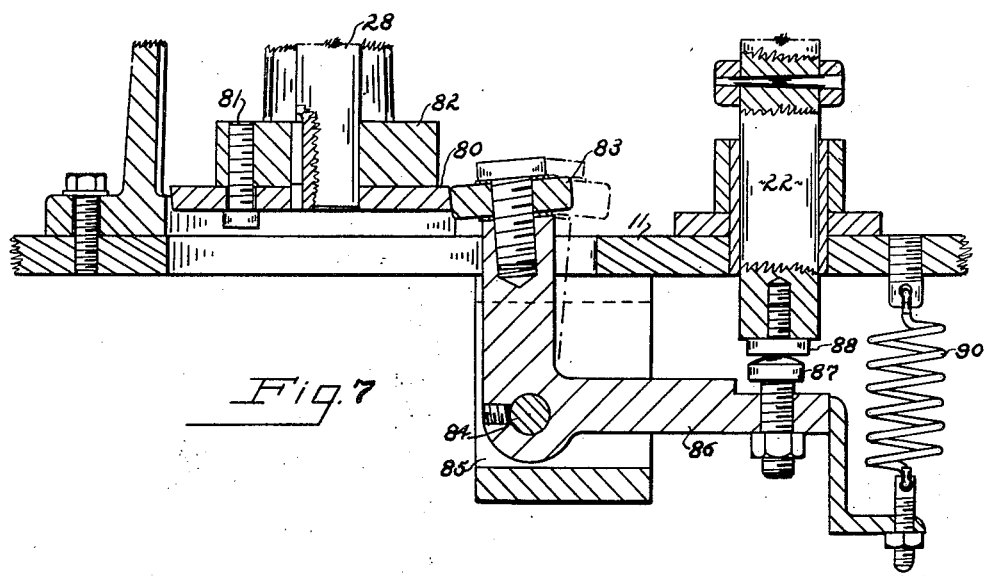
INVENTOR.
EUGENE G. ARELT
BY
Bodell & Thompson
ATTORNEYS Oct. 5, 1954     E. G. ARELT     2,690,620

APPARATUS FOR GAUGING DISHES

Filed Aug. 30, 1950     8 Sheets-Sheet 6

INVENTOR.
EUGENE G. ARELT
BY Bodell + Thompson
ATTORNEYS

Oct. 5, 1954

E. G. ARELT 2,690,620

APPARATUS FOR GAUGING DISHES

Filed Aug. 30, 1950

INVENTOR.
EUGENE G. ARELT
BY Boolell & Thompson
ATTORNEYS

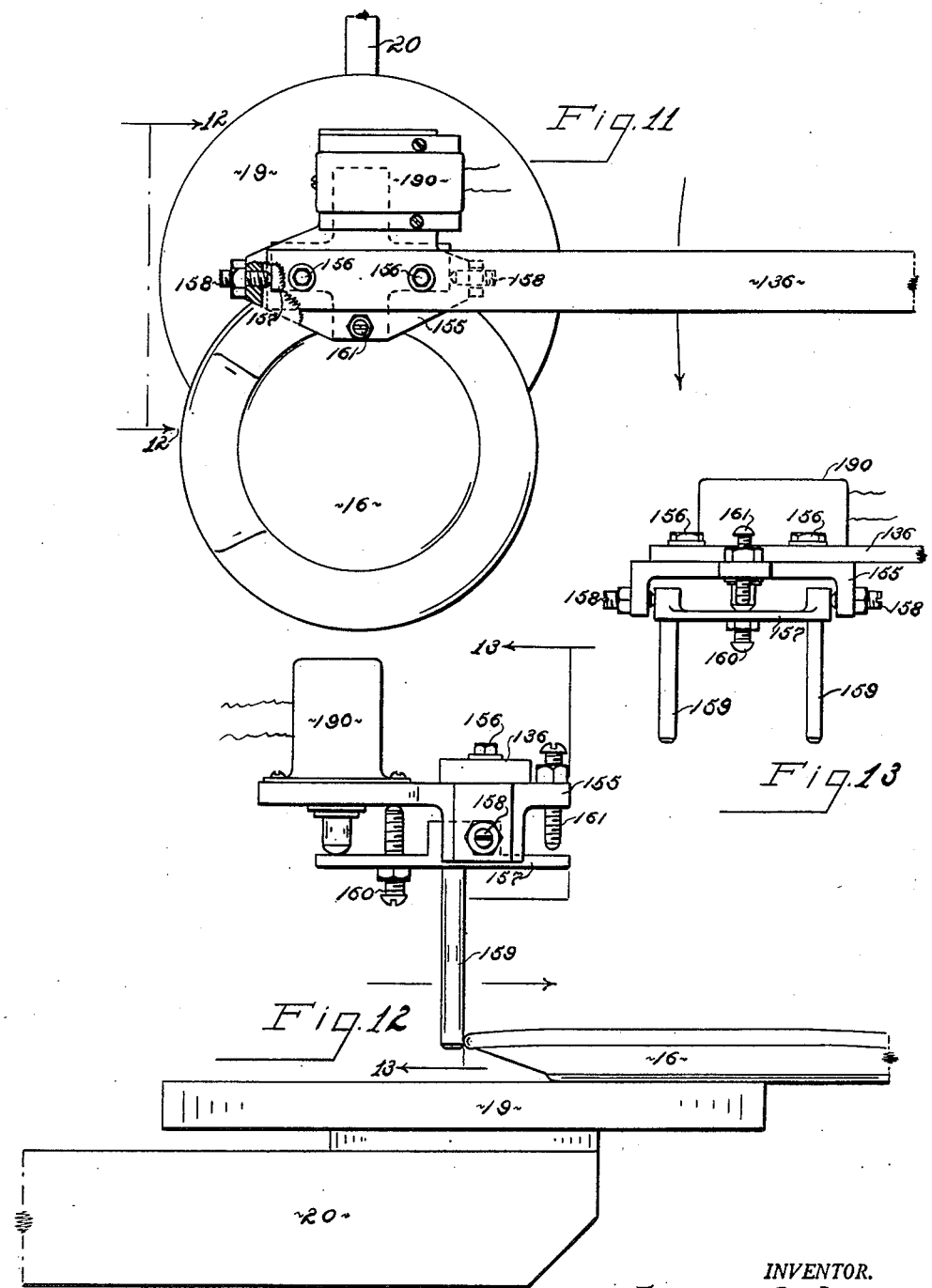

Patented Oct. 5, 1954

2,690,620

UNITED STATES PATENT OFFICE 2,690,620

APPARATUS FOR GAUGING DISHES

Eugene G. Arelt, Syracuse, N. Y., assignor to Onondaga Pottery Company, Syracuse, N. Y., a corporation of New York Application August 30, 1950, Serial No. 182,298

7 Claims. (Cl. 33—174)

This invention has to do with apparatus for gauging or testing articles of pottery ware, and more particularly for determining the height at a multiplicity of points on the brim of a dish, such as a plate, above the plane of the foot of the dish.

During the drying and shrinking of articles of pottery ware on absorbent moulds, the article often warps or draws out of shape. This is caused by many factors known to those skilled in the art of making articles of tableware. If the defective dish is not detected in the air dried or green stage, and is further processed by being fired in the kiln and then rejected, the loss through the additional handling and processing is appreciable. If the defective piece is fired in the kiln, it is then a total loss and has to be thrown out. On the other hand, if the defective piece is detected while in the green or unfired state, the clay material can be reworked. Preparatory to being fired, the dishes are arranged in a stack and the spaces between the brim portions of the dishes are filled with a suitable granular material. This material serves to support the pieces of ware which become soft and pliable at the high firing temperature. Accordingly, a piece of warped ware often prevents proper packing of the granular material, with the result another dish will not be properly supported during the firing operation and it too will become warped.

For these and other reasons, it therefore becomes of great value to be able to detect warped or crooked ware in the green or unfired stage, and to discard the defective pieces.

At the present time, visual inspection of the ware is relied upon and is usually done after the ware is piled or stacked up preparatory to placing it in the kiln for firing. With this procedure, there always exists the failure of the human factor and it is quite impossible to establish any uniform degree of variation from the perfect piece of ware inasmuch as the visual determination varies from operator to operator and, in fact, varies with the same operator from time to time. In the event the operator reaches the conclusion that a piece of ware is warped to the extent that it is defective, it is necessary to unpile the ware and repile it again. A piece of ware may not have any warpage but yet be defective. For example, the brim of the dish may be straight but too high above the foot, or too close to the foot, of the piece of ware. These differences in the height of the brim from the normal are caused from uneven moisture content in the piece of ware as it is formed, or uneven drying on the mould.

This invention has an object an apparatus for automatically gauging the rim of a piece of ware in respect to the height of the rim above the foot of the piece, and embodies a particularly inexpensive structure, extremely sensitive in operation and particularly adapted for gauging the green or unfired fragile ware which has an extremely low tensile strength.

The invention has as a further object an apparatus of the type referred to embodying mechanism which operates automatically to eject articles of predetermined departure from rim straightness and/or height. The apparatus further embodies a structural arrangement whereby it may be quickly and conveniently adjusted for gauging pottery ware articles of different dimensions and for adjusting or varying the tolerances within which the piece of ware must come in order to be accepted as a satisfactory piece of ware.

The invention consists in the novel features and in the combinations and constructions hereinafter set forth and claimed.

In describing this invention, reference is had to the accompanying drawings in which like characters designate corresponding parts in all the views.

Figure 6 is a view taken on line 6—6, Figure 1.

Figure 7 is a sectional view taken on line 7—7, Figure 6.

Figure 11 is a top plan view of the ware ejector arm moving a piece of defective ware from the ware support.

Figure 12 is an end elevational view indicated by the line 12—12, Figure 11.

Figure 13 is a side elevational view corresponding to line 13—13, Figure 12.

Figure 1:
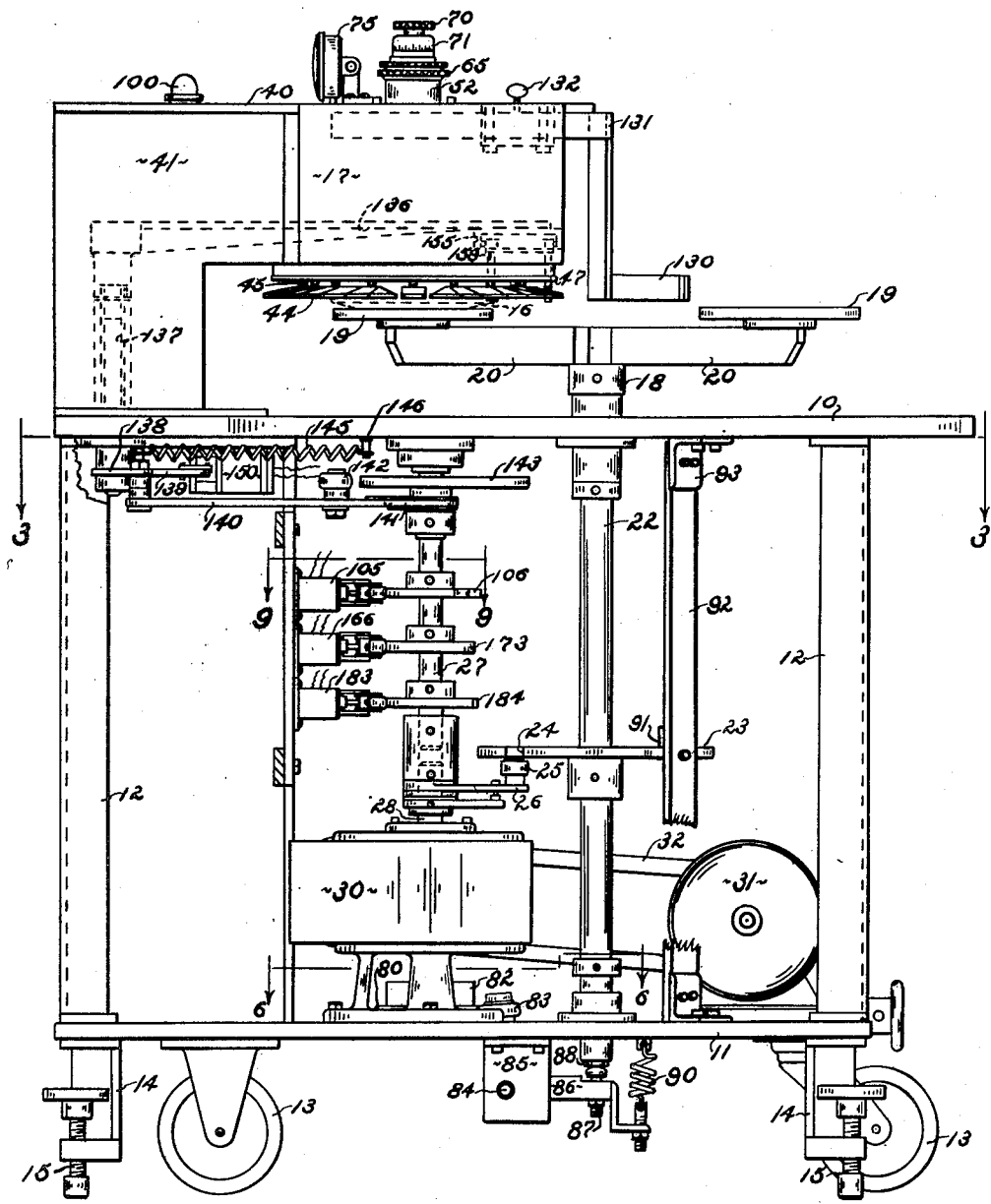
Figure 1 is a side elevational view of a ware testing apparatus embodying my invention.

The apparatus comprises a framework including upper and lower plates 10, 11, the upper plate being supported on vertical corner posts 12, and the lower plate 11 being mounted on casters 13 to make the apparatus readily portable. There are a plurality of depending members 14 threaded to receive leveling screws 15 which serve to elevate the machine off the casters 13 and to provide a convenient means for leveling the machine. The dishes, or pieces of ware indicated at 16, are successively moved into registration with a gauging head indicated generally at 17 by a ware advancing means or conveyor here shown as a turret 18 having a plurality of dish supporting members 19 carried on arms 20.

Figure 4:
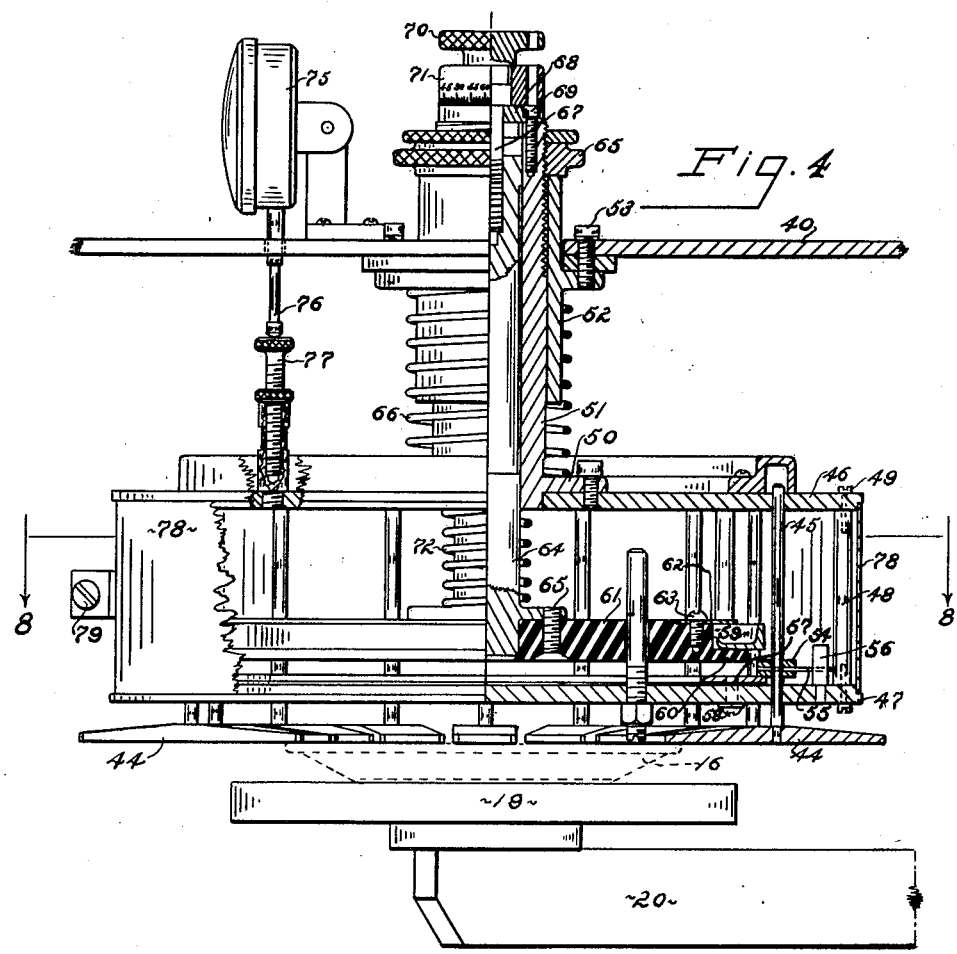
Figure 4 is an enlarged side elevational view of the gauging head with the right portion thereof in vertical section and with parts broken away in the left portion.
Figure 5:
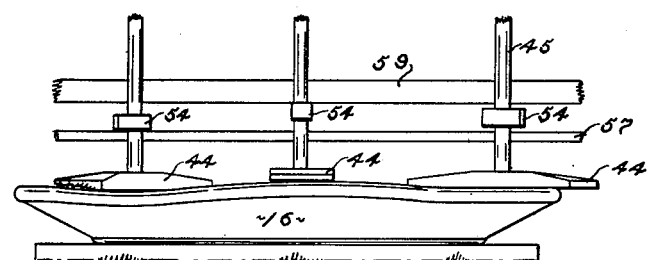
Figure 5 is a side elevational view of a warped dish illustrating diagrammatically the position of various feeling fingers engaging the dish.
Figure 8:
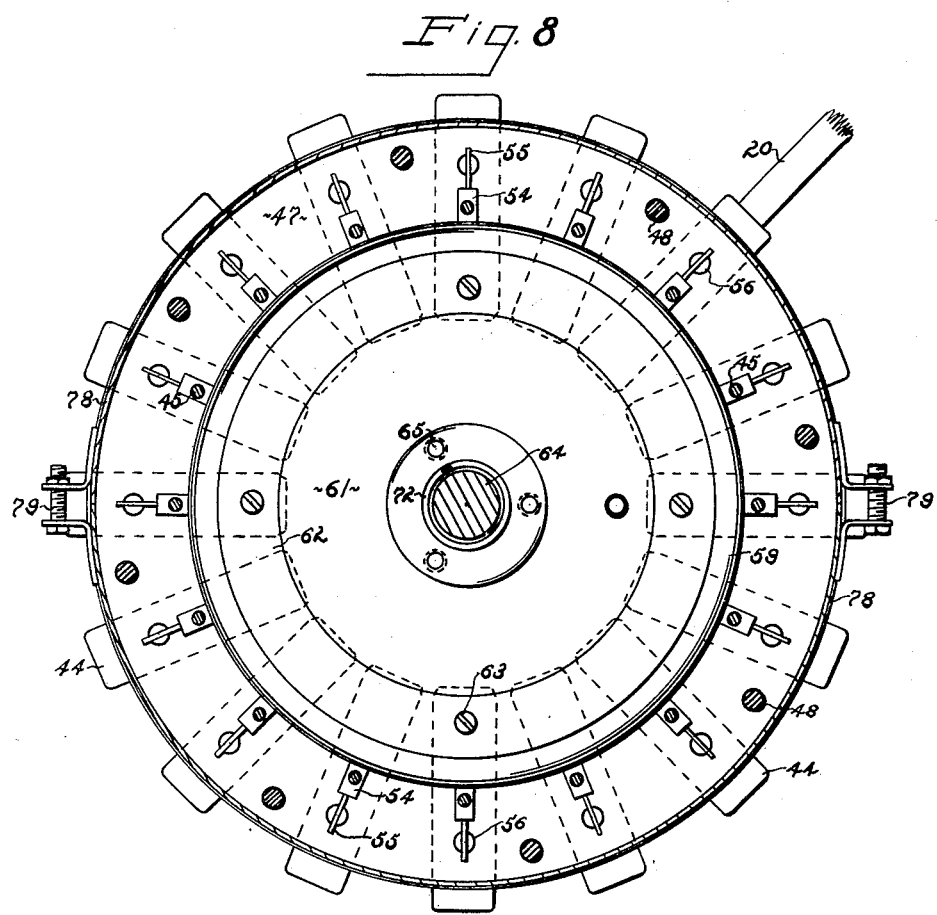
Figure 8 is a view taken on line 8—8 Figure 4.
Figure 9:
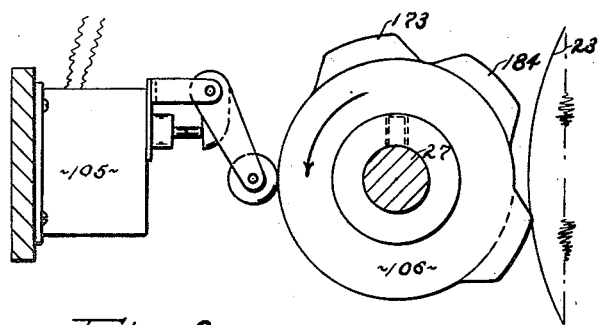
Figure 9 is a view taken on line 9—9, Figure 1.

The turret is mounted upon the upper end of a shaft 22 journalled vertically in the plates 10, 11, and which is intermittently indexed by a Geneva disk 23 fixedly secured to the shaft 22. The slots 24 of the Geneva disk are engaged by a roller 25 carrier on a crank arm 26 mounted on a shaft 27, the upper end of which is journalled in the upper plate 10, and the lower end is connected to the output shaft 28 of a gear reduction 30 mounted on the bottom plate 11. The gear reduction 30 is operatively connected to a driving motor 31 through a suitable belt 32. The gauging head, Figure 4, is suspended from a supporting plate 40 mounted on a boxlike structure 41 fixed to one corner of the top plate 10. This head includes an annular series of feeler fingers 44, each of which is fixed to the lower end of a stem 45 slidably mounted in plates 46, 47. These plates are secured together in spaced relation by spacing posts 48 and screws 49. The plates are fixed to the hub portion 50 of a sleeve 51. The sleeve 51 is slidably mounted in a collar 52 secured to the supporting plate 40, as by screws 53.

Each of the stems 45 is provided with a radially extending contact 54 having an extension in the form of a pin 55 slidably mounted in a slotted stud 56 secured to the bottom plate 47. This arrangement serves to prevent rotation of the stems 45 while permitting individual vertical movement of the stems and the fingers 44 carried thereby. The fingers 44 are formed of light material, such as aluminum, and the stems 45 of small diameter so that each finger assembly is very light in weight and freely movable vertically whereby engagement of the fingers with or by the brim of a piece of green fragile ware will not injure the ware. An annular contact 57 is secured to the bottom plate 47, as by screws 58, and is insulated from the plate. Normally, the contacts 54 carried by the stems 45 rest upon the annular contact 57.

When the stems and contacts 54 are moved upwardly a predetermined distance, they engage an upper annular contact 59 which is positioned upon a circumferential flange 60 formed on the periphery of a disk 61 formed of insulating material. The contact 59 is not affixed to the disk 61, but is permitted to freely move upwardly off from the flange 60, this upward movement being limited by a washer 62 affixed to the top surface of the disk by screws 63 and overhanging the flange 60. The annular contact 59 is also formed of light weight electrical conducting material, such as aluminum, so when it is engaged by one or more of the contacts 54, it will not offer resistance to further upward movement of the finger sufficient to break the piece of ware.

The disk 61 is affixed to the lower end of a shaft 64, as by screws 65. The shaft 64 is slidably mounted in the sleeve 51. The sleeve 51 is externally threaded at its upper end to receive an adjusting nut 65 engaging the upper edge of the collar 52. The sleeve 51 is yieldingly urged downwardly by a compression coil spring 66 interposed between the flange 50 of the sleeve and the mounting flange of the collar 52, see Figure 4. With this arrangement, the plates 46, 47, may be adjusted vertically relative to the plates 40 and 10.

The upper end of the shaft 64 terminates short of the upper end of the sleeve 51 and is provided with an internally threaded bore to receive an adjusting screw 67 journalled in a disk 68 affixed to the upper end of the sleeve 51, as by screws 69. The upper end of the screw 67 is provided with a knurled knob 70 for rotating the screw, and the screw carries a conventional friction driven graduated collar 71. The shaft 64 is yieldingly urged downwardly by a coil compression spring 72. With this structural arrangement, the shaft 64 is adjusted vertically relative to the sleeve 51 by manipulation of the screw 67, the graduated collar 71 permitting a micrometer or precision adjustment.

To aid in the precise adjustment of the plates 46, 47, a conventional dial indicator 75 is mounted upon the supporting plate 40 with its actuating stem 76 engaging a screw 77 adjustably mounted in the plate 46. The contact structure is enclosed by a band 78 positioned in confronting recesses formed in the periphery of the plates 46, 47. The band is clamped in place by screws 79.

The dish supports 19 are successively moved in registration with the annular series of gauging fingers 44, as previously stated. During the indexing movement, the supports 19 are positioned so that the dishes, indicated at 16, carried thereby are moved in a plane somewhat below the fingers 44 when they are in their down position, or with their contacts 54 engaging the contact 57. When the supports 19 are moved in registration with the gauging head, the shaft 22 is elevated a predetermined distance. The gauging head proper is adjusted by the nut 65 so that the brim of the dish elevated by the turret will engage the fingers 44 and more them upwardly, moving their contacts 54 out of engagement with the contact 57.

If there is a point on the brim of the dish sufficiently below the normal plane of the brim so that one or more of the fingers 44 are not engaged and therefore the associated contacts 54 are not separated from contact 57, a visual signal will be given to the operator and that defective piece of ware will be ejected.

On the other hand, if the dish has a point in the brim engaging a finger and moving it upwardly sufficiently to engage the upper contact 59, such engagement will complete another circuit and give a different visual signal to the operator, and the defective piece of ware will be ejected.

In other words, the head proper is initially adjusted by the nut 65, so that the brim of a particular dish, which is straight or parallel with the foot of the disk, and at the proper height therefrom, will move all of the fingers 44 upwardly a sufficient distance to separate the contacts 54, 57. The shaft 64 is adjusted to determine the position of the upper contact 59 and accordingly the distance to be traveled by the contacts 54 for engagement with the contact 59. Accordingly, the apparatus gauges the entire circumference of the brim of the dish for points thereof which are either below or above a plane parallel with the foot of the dish and a predetermined distance therefrom, and the tolerance, which is allowable, is determined by the adjustment of the head proper and the disk 61.

The shaft 22 is elevated when each of the disk supports 19 are moved in registration with the gauging head by the structure shown in Figures 6 and 7.

A cam 80 is mounted on the lower end of the shaft 28 by being adjustably secured by screws 81 to a collar 82 keyed to the shaft. This cam engages a roller 83 journalled on the upper end of a bell crank lever pivoted at 84 in a bracket 85 depending from the bottom plate 11. This lever has a laterally extending arm portion 86 provided with an adjusting screw 87 engaging the head of a screw 88 mounted in the lower end of the turret shaft 22. The cam 80 is effective to move the bell crank lever in a clockwise direction about the pivot 84 against a coil tension spring 90 connected to the plate 11 and the outer end of the arm 86. The low portion of the cam 80 permits the spring 90 to oscillate the lever in a counter-clockwise direction and to effect upward movement of the shaft 22, as illustrated in Figures 6 and 7. The cam 80 is so formed and positioned on the shaft 28 to effect upward movement of the shaft 22 while the crank roller 25 is out of engagement with the slots 24 of the Geneva disk 23 as will be apparent. Upon upward movement of the shaft 27, one of the slots 24 engages a stationary detent 91 mounted on a vertically extending bar 92. The ends of this bar are secured to the upper and lower plates 10, 11, by angle pieces 93. This detent arrangement serves to prevent any rotative movement of the turret during the vertical movement thereof.

The apparatus includes electrically operated means for giving a visual signal to the operator in the event there is a point in the brim of the disk being gauged located a predetermined distance above or below the plane in which the brim of the dish would extend if parallel to the foot of the piece of ware and a normal distance therefrom. If the brim of the dish is distorted so as to raise one of the fingers 44 upwardly to bring its contact 54 into engagement with the contact 59, a circuit is completed to a signal lamp 100.

Figure 10:
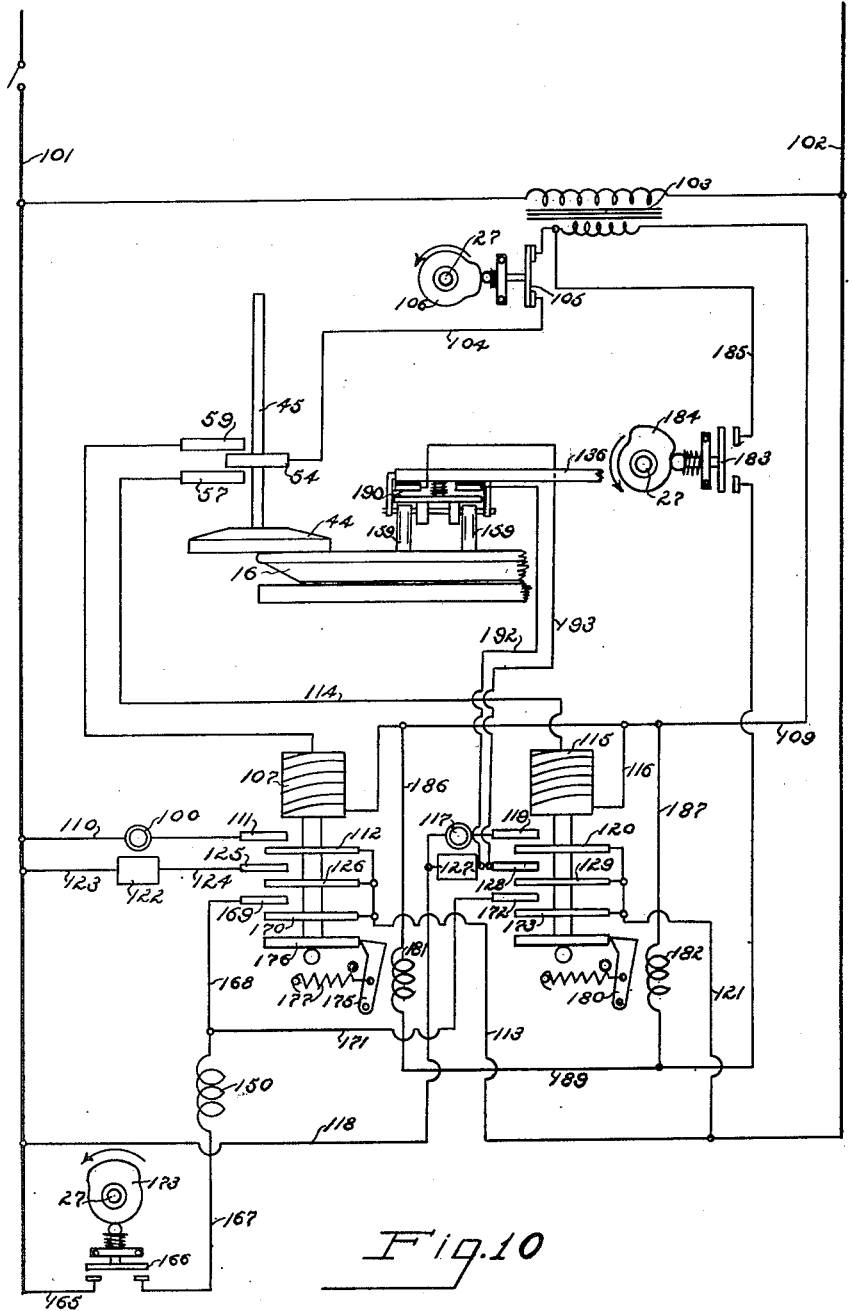
Figure 10 is a schematic wiring diagram of the electrical circuit embodied in the apparatus.

Referring to the schematic wiring diagram Figure 10, wires 101, 102, designate the feed line for the apparatus. A transformer 103 is connected across this line. One side of the secondary coil of the transformer is connected to the movable contact 54 through wire 104 and normally open switch 105. The switch 105 is periodically closed by a cam 106 mounted on the shaft 27. Engagement of the contact 54 with contact 59 extends this circuit to the coil 107 of a relay, the opposite side of the coil being connected to the other side of the secondary of transformer 103, through wire 109. The signal lamp 100 is connected to the supply wire 101 through wire 110, and to a fixed contact 111 of the relay. The contact 111 is engaged by the movable contact 112 which is connected to the other side 102 of the line through wire 113. Thus, a signal is given to the operator indicating that the brim of the dish is distorted sufficiently with a high spot exceeding the allowed tolerance.

In like manner, a low spot in the brim of the dish exceeding the allowed tolerance will cause contact 54 to remain in engagement with contact 57 which, through wire 114, is connected to the wire 109 by wire 116. A second lamp 117 is connected to the line 101 by wire 118 through contacts 119, 120, of the relay, and to the line 102 through wire 121.

A counter 122 is energized simultaneously with the lamp 100 through wires 123, 124, contacts 125, 126, and wire 113 to the other side of the line 102. Inasmuch as the counter 122 is thus energized through the relay 107, it is apparent that it serves to record the number of pieces that have portions in their rims exceeding the normal height from the foot of the piece. There is a similar counter 127 controlled partially by the relay 115 and partially by other means, hereinafter described, for recording the number of pieces of ware which have points in their brims below the normal.

The cam 106 is positioned on the shaft 27 so as to energize the contact 54 for at least a portion of the time the dish supports 19 are in elevated position.

Figure 2:
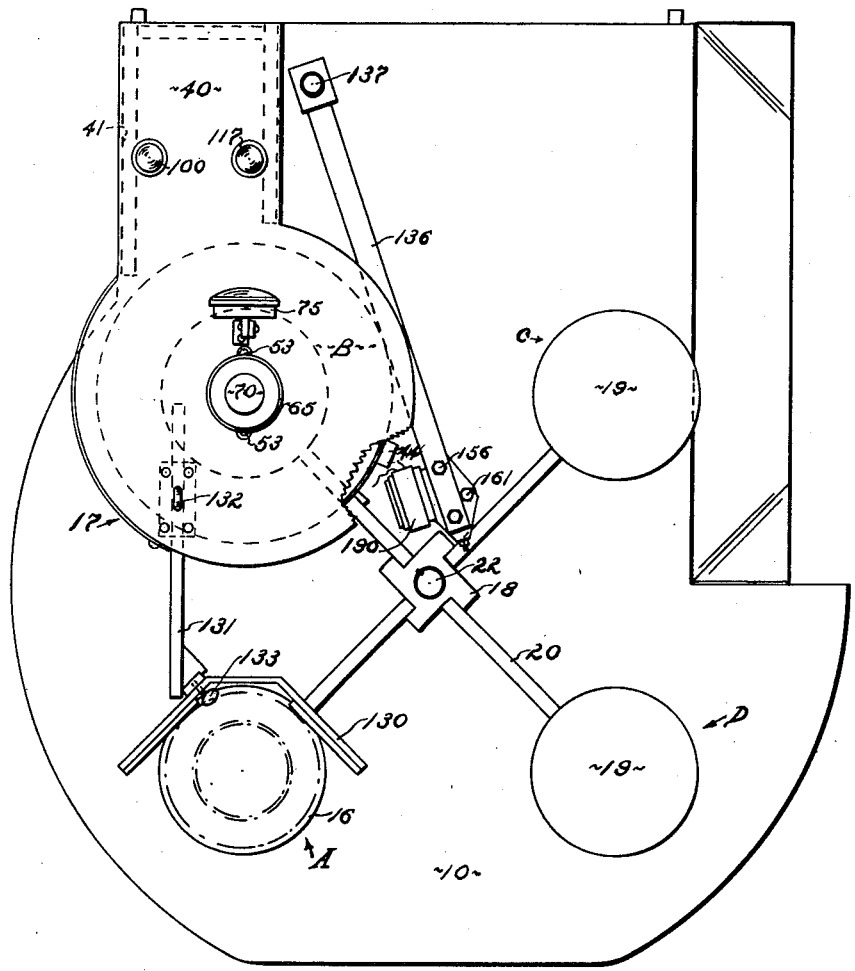
Figure 2 is a top plan view of the apparatus.

The pieces of ware are placed upon the supports 19 as each support is indexed to position A, Figure 2. At this station, there is a substantially V shaped positioning guide member 130 carried by a bracket 131 attached to the plate 40 for adjustment toward and from the axis of the gauging head, the bracket being secured in adjusted position by thumb screw 132. The positioning guide 130 is attached to the bracket 131 by a screw 133 to permit vertical adjustment of the guide piece. The purpose of the guide piece 130 is to properly center the pieces of ware on the supports 19 so that the pieces of ware will properly engage the gauging fingers 44.

The turret is indexed to position B with the piece of ware in registration with the gauging head and after the dish has been gauged, it is moved to position C where if the defect or warpage in the piece of ware exceeds the predetermined tolerances, the piece is ejected from the support 19. If the piece of ware gauges satisfactory, it is indexed to position D where it is removed by the operator.

Figure 3:
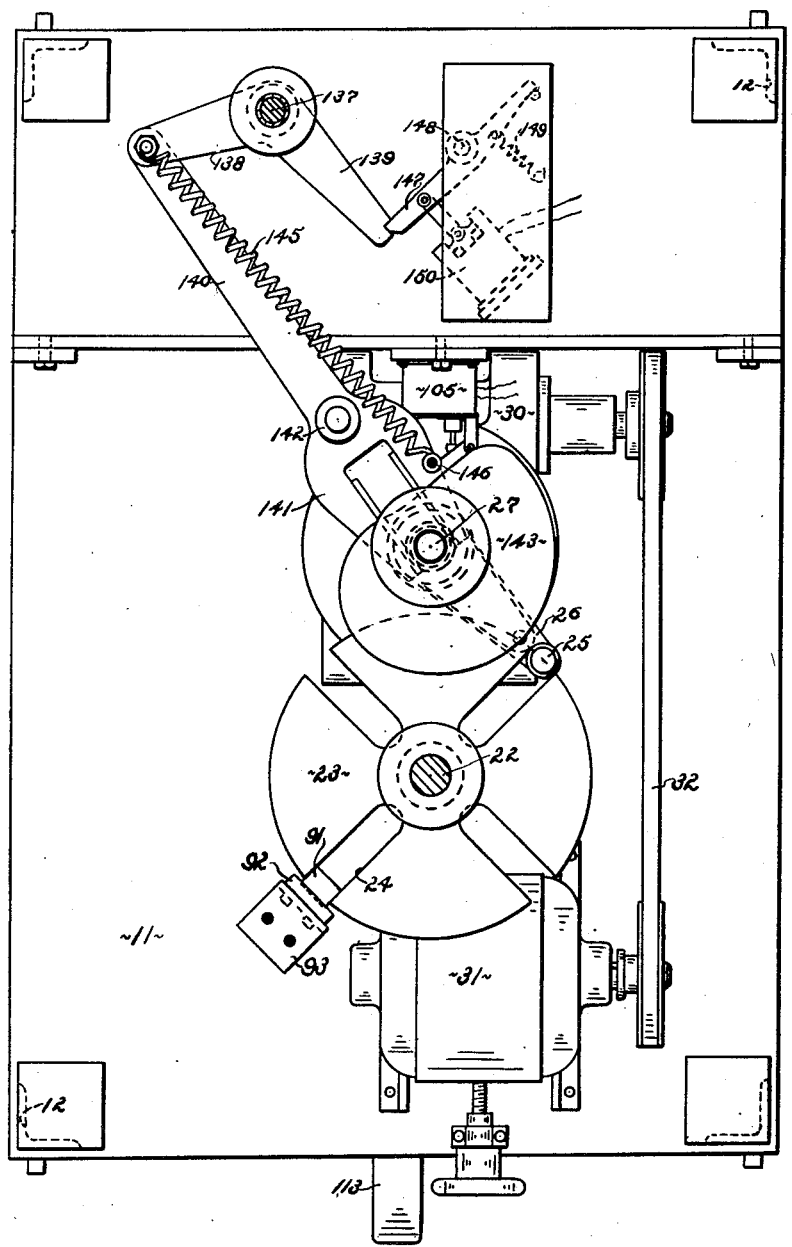
Figure 3 is a view taken on line 3—3, Figure 1.

The defective pieces of ware are ejected at station C by movement of an arm 136 attached at one end to a shaft 137 journalled vertically in a suitable bearing structure carried by the plate 10. A bell crank lever having arms 138, 139, Figure 3, is fixedly secured to the lower end of the shaft 137 below the plate 10. The arm 138 has pivotally connected to it an arm 140 formed at its opposite end with a yoke structure 141 slidably mounted upon the cam shaft 27. The arm 140 has a roller 142 arranged to be engaged by a cam 143 mounted near the upper end of the cam shaft 27, see Figures 1 and 3. The arm 140 is yieldingly urged toward the cam shaft 27 by a coil tension spring 145 fixed at the pivot point of the arm and at its opposite end to a pin 146 depending from the plate 10.

The arm 139 is notched at its outer end to receive a latch member 147 and which is pivotally mounted at 148 intermediate its ends and is urged into latching engagement with the arm 139 by tension spring 149. The latch is moved out of latching relation by a solenoid 150.

Referring to Figures 2, 11, 12 and 13, the arm 136 is of such length that its free end will move over a dish support 19 at station C. A U shaped bracket 155 is mounted on the free end of the arm, as by screws 156. A member 157 is mounted for pivotal movement between the legs of the bracket 155 on pivot screws 158. The member 157 has a pair of spaced apart pins 159 depending therefrom for engagement with the piece of ware 16 positioned on the support 19. The pivotal movement of the member 157 is limited in a clockwise direction, Figure 12, by an adjusting screw 160 threaded into the member, and in the opposite direction by a similar screw 161 threaded into the bracket 155.

If during the gauging of a piece of ware the height above the plane of the foot of any contacted portion of the brim departs from the standard more than the allowable tolerance, the solenoid 150 is energized, withdrawing the latch 147 from the arm 139. The circuit to the solenoid 150 is through wire 165, switch 166, wire 167, solenoid 150, and if relay 107 is closed, through wire 168, contacts 169, 170, wire 113, to wire 102. If relay 115 is closed, the circuit is from the solenoid 150, through wire 171, contacts 172, 173, wire 121, to wire 102. The switch 166 is periodically closed by a cam 173 mounted on the cam shaft 27. This switch is closed during a portion of the time the turret is at rest in elevated position. In order that this circuit will be completed after the gauged piece of ware has been moved from position B to position C, the relays 107, 115, are provided with means for holding them closed. As shown in the schematic diagram, Figure 10, a latch 175 is urged beneath a member 176 movable with the contact 112, 126 and 170, this latching being effected by spring 177.

In like manner, a latch 180 is provided for relay 115. The latches 175, 180, are withdrawn from latching position by solenoid coils 181, 182, respectively. These solenoid coils 181, 182, are connected in parallel arrangement through a switch 183 which is periodically closed by a cam 184 also mounted on shaft 27.

The cam arrangement is such that cam 184 will close switch 183 establishing a circuit through wires 185, 189, solenoids 181, 182, wires 186, 187, to the return wire 109, shortly after the completion of the indexing movement. In other words, the relays 107, 115, are closed by contacts 54, 57, 59 and remain closed until after the gauged piece has been indexed to position C. It will be apparent that this is only in the event of the piece of ware being defective. With either relay 107, 115, closed, cam 173 will close switch 166, thus energizing the solenoid 150, releasing the arm 139 and at this time cam 143 is in the position shown in Figure 3, whereupon the spring 145 will actuate the arm 140 and accordingly effect a counter-clockwise rotation of the shaft 137, Figures 2 and 3, causing the arm 136 to sweep over the support 19 and cause the depending members 159 to engage the dish and eject it from the support. A suitable waste receptacle, not shown, is provided for receiving the ejected pieces of green ware. When the depending members 159 engage the piece of ware, as shown in Figures 11 and 12, the member 157 is caused to rock on the pivots 158, effecting actuation of a switch 190 mounted on the bracket 155. This switch energizes the counter 127 through wires 192, 193, contacts 128, 129, if relay 115 is closed, and wire 121 to wire 102. That is, the counter 127 records the number of pieces of ware found defective in that they had one or more portions in their brims below the required standard. The purpose of having this counter under the control of the switch 190, as well as the relay 115, is because the relay 115 may become energized due to the fact that the entire brim of the piece of ware is sufficiently below the required standard as not to engage any of the fingers 44. However, this situation might arise by the particular support 19 not having any dish placed upon it, in which event if the counter were controlled solely by the relay 115, it would give an inaccurate count. In other words, a dish having a low brim is counted by actuation of the switch 190 in the ejecting operation. If there is no dish to be ejected, the counter 127 is not energized.

In the schematic wiring diagram Figure 10, various manual switches in different parts of the electrical circuit have been omitted for simplification. Such switches are desirable, as will be apparent, for adjusting and setting up the apparatus initially.

The gauging apparatus described functions very efficiently to gauge pieces of green unfired ware, which is very fragile, without damaging the ware, and the operation of this apparatus results in the production of uniform straight ware conforming to close tolerances. The apparatus further effects great saving in the cost of processing pieces of ware which later are rejected because of defects not discovered in the early stages of manufacture. It also effects saving of clay material in that the defective ware is discovered at a stage when the material can be reworked. It is obvious that the apparatus can also be used to gauge fired or finished ware and, when so used, serves to indicate defects, if any, resulting from the firing or finishing process.

What I claim is:

1. Apparatus for gauging the height and straightness of the brim of a dish comprising a gauging head having upper and lower annular contacts spaced apart axially, an annular series of movable contacts normally positioned on said lower contact, a feeler depending from each movable contact, said feelers being independently mounted for free vertical movement in said head, a dish support for supporting a dish with the foot thereof positioned a predetermined distance below said lower contact and with the brim of the dish engaging said feeler members, a signal circuit including a signal, said feeler contacts and said lower contact, a second signal circuit including a second signal, said feeler contacts and said upper contact, and means for adjusting said upper contact toward and from said lower contact.

2. Apparatus for gauging dishes for brim height and straightness comprising means for advancing a procession of dishes and successively presenting the same to a gauging head, upper and lower annular contacts mounted in said head, means operable to effect relative axial movement between said contacts to vary the space therebetween, an annular series of feelers depending from said head, a contact connected to each feeler and normally positioned on said lower contact, said feelers being mounted in the head for free independent vertical movement and being operable upon such vertical movement to move the contacts carried thereby into engagement with said upper contact, said feelers being elevated by presentation of a dish to said head and having a brim of predetermined height and straightness to position said feeler contacts intermediate said upper and lower contacts.

3. Apparatus for gauging the height and straightness of the brim of a dish comprising a dish support, a gauging head mounted above said support, an annular lower contact fixedly mounted in said head, an upper annular contact arranged in register with said lower contact, means operable to adjust said upper contact toward and from said lower contact, an annular series of feelers depending from said head, each of said feelers being mounted in the head for free vertical movement and carrying a contact normally positioned on said lower annular contact, actuating means operable to effect relative vertical movement between said support and said head to effect engagement of a dish brim of predetermined height and straightness with said feelers, and to move said feeler contacts intermediate said upper and lower annular contacts.

4. Apparatus for gauging the height of the brim of a dish above the foot thereof comprising a gauging head having an annular series of feeler members depending therefrom and normally arranged in a common plane, a dish support for supporting a dish with the foot of the dish positioned a predetermined distance below the normal plane of said feelers, each of said feelers being independently mounted for free vertical movement by the brim of the dish, a contact connected to and movable with each feeler, a lower annular contact mounted in said head and common to all of said feeler contacts and engaged thereby when said feelers are in normal position, an upper annular contact mounted in said head and spaced a predetermined distance above said lower contact and being also common to all of said feeler contacts, a signal circuit including said feeler contacts and said lower contact, a second signal circuit including said feeler contacts and said upper contact, means operable to effect vertical adjustment of said gauging head toward and from said dish support, and means operable to effect vertical adjustment of said upper contact toward and from said lower contact.

5. Apparatus for determining the height and straightness of the brims of dishes advanced in a procession comprising a frame, a shaft journalled vertically in the frame, a turret having a circular series of dish supports mounted on said shaft, a gauging head mounted on the frame above the path traveled by said dish supports, said head including an annular series of feelers depending therefrom and mounted for free individual vertical movement, a signal circuit including a lower annular contact and a second signal circuit including an upper annular contact, a contact carried by each of said feelers and being movable into and out of engagement with said upper and lower contacts respectively upon vertical movement of each feeler, indexing means operable to index said turret and bring said dish supports successively in registration with said gauging head, turret elevating means operable to effect elevation of said turret to move the brim of a dish carried on said supports into engagement with said feelers, and switch means operable to energize all of said feeler contacts simultaneously upon elevation of the turret.

6. Apparatus for determining the height and brim straightness of a dish comprising a frame, a gauging head housing mounted on the frame, means for adjusting said head vertically, a lower annular contact fixedly mounted in the housing, an upper annular contact mounted in the housing in registration with said lower contact, and means for adjusting said upper contact toward and from said lower contact, an annular series of feelers depending from the housing and mounted therein for free independent vertical movement, a contact carried by each of said feelers and positioned intermediate said upper and lower annular contacts and being movable into and out of engagement therewith upon vertical movement of said feelers, a plurality of dish supports operable to advance a procession of dishes in a plane below said head and present the dishes successively in registration therewith, means operable to elevate said supports to move a dish mounted thereon into engagement with said feelers, a signal circuit including said upper contact, and a signal circuit including said lower contact, and switch means operable upon elevation of said supports to energize all of said feeler contacts.

7. Apparatus for gauging dishes for brim height and straightness comprising means for advancing a procession of dishes and successively presenting the same to a gauging head, a lower annular contact mounted in said head, a contact support mounted in the head above said lower contact, an upper annular contact positioned on said contact support, an annular series of feelers depending from said head for engagement with the rim of a dish, a contact connected to each feeler and normally positioned on said lower contact, said feelers being mounted in the head for free independent vertical movement and being operable upon such vertical movement to move the contacts carried thereby into engagement with said upper contact, said upper annular contact being mounted for free vertical movement upon engagement by any one of said feeler contacts, and means for adjusting said upper contact support toward and from said lower contact.

References Cited in the file of this patent

UNITED STATES PATENTS

| Number | Name | Date |
|---|---|---|
| 1,442,233 | Norton | Jan. 16, 1923 |
| 1,682,464 | Arelt | Aug. 28, 1928 |
| 2,018,399 | Engst | Oct. 22, 1935 |
| 2,177,051 | Birmingham | Oct. 24, 1939 |
| 2,321,191 | Elmendorf | June 8, 1943 |
| 2,373,989 | Wurger | Apr. 17, 1945 |
| 2,487,628 | Aller | Nov. 8, 1949 |
| 2,563,216 | Dale | Aug. 7, 1951 |